(12) United States Patent
Dirnberger

(10) Patent No.: US 12,416,326 B2
(45) Date of Patent: Sep. 16, 2025

(54) DECOUPLING ELEMENT FOR REDUCING STRUCTURE-BORNE NOISE, PARTICULARLY FOR USE IN A HEAT SHIELD SYSTEM

(71) Applicant: ElringKlinger AG, Dettingen-Erms (DE)

(72) Inventor: Pascal Dirnberger, Eckental (DE)

(73) Assignee: ElringKlinger AG, Dettingen-Erms (DE)

( * ) Notice: Subject to any disclaimer, the term of this patent is extended or adjusted under 35 U.S.C. 154(b) by 978 days.

(21) Appl. No.: 17/434,753

(22) PCT Filed: Feb. 18, 2020

(86) PCT No.: PCT/EP2020/054164
§ 371 (c)(1),
(2) Date: Aug. 29, 2021

(87) PCT Pub. No.: WO2020/178017
PCT Pub. Date: Sep. 10, 2020

(65) Prior Publication Data
US 2022/0170493 A1    Jun. 2, 2022

(30) Foreign Application Priority Data

Mar. 1, 2019   (DE) .......................... 102019105237.8

(51) Int. Cl.
*F16B 5/06* (2006.01)
*F16B 5/02* (2006.01)

(52) U.S. Cl.
CPC ............ *F16B 5/065* (2013.01); *F16B 5/0241* (2013.01)

(58) Field of Classification Search
None
See application file for complete search history.

(56) References Cited

U.S. PATENT DOCUMENTS 5,090,746 A  *  2/1992  Holzhausen ........ F16L 27/0857
                                           285/364
5,836,624 A  *  11/1998  Brandener .............. F16L 27/04
                                           72/367.1
(Continued)

FOREIGN PATENT DOCUMENTS

DE    102016106150 A1 *  10/2017  ......... B60R 13/0876
DE    102016106151 A1    10/2017
(Continued)

*Primary Examiner* — Matthew R Mcmahon

(57) ABSTRACT

A decoupling element for reducing structure-borne noise, particularly for use in a heat shield system, having a sleeve element with an insertion opening for the insertion of a fastener for fastening to a partner fastener, wherein the insertion opening extends in an axial direction of the sleeve element and the sleeve element has collars protruding in a radial direction, which are spaced apart from each other in the axial direction, wherein between the collars, a damping element is positioned, which extends radially outward beyond the collars and is provided to be fastened to a heat-shielding part by means of a fastening element, and the damping element is embodied as a metal wire structure, wherein the damping element is positioned so that it is elastically prestressed in the axial direction in a gap between the collars of the sleeve element.

6 Claims, 3 Drawing Sheets

(56) References Cited

U.S. PATENT DOCUMENTS

| | | | | |
|---|---|---|---|---|
| 9,964,175 B2* | 5/2018 | Herald | ................... | F16F 15/06 |
| 10,974,665 B2* | 4/2021 | Heiselbetz | .......... | F01N 13/1811 |
| 11,131,334 B2* | 9/2021 | Glauber | ............... | F16B 5/0241 |
| 11,162,408 B2* | 11/2021 | Heiselbetz | ............ | F01N 13/102 |
| 2014/0354130 A1 | 12/2014 | Lagree et al. | | |
| 2017/0130758 A1 | 5/2017 | Turner et al. | | |
| 2021/0239028 A1* | 8/2021 | Nakano | ................. | F01N 13/102 |
| 2024/0191773 A1* | 6/2024 | Nakano | .................... | F16F 1/34 |

FOREIGN PATENT DOCUMENTS

| | | |
|---|---|---|
| DE | 102016106153 A1 | 10/2017 |
| EP | 3252340 A1 | 12/2017 |
| EP | 1548246 B1 | 3/2018 |
| EP | 3293411 A1 | 3/2018 |
| JP | 6212047 B2 | 9/2017 |
| JP | 2017219192 A | 12/2017 |
| JP | 2018123895 A | 8/2018 |
| WO | 2016172399 A1 | 10/2016 |

* cited by examiner

DECOUPLING ELEMENT FOR REDUCING STRUCTURE-BORNE NOISE, PARTICULARLY FOR USE IN A HEAT SHIELD SYSTEM

FIELD OF THE INVENTION

The invention relates to a decoupling element for reducing structure-borne noise, particularly for use in a heat shield system.

BACKGROUND OF THE INVENTION

A decoupling element of this generic type is known from EP 1 548 246 B1. A decoupling element of this kind has a sleeve and a damping element that surrounds the sleeve. The damping element is fastened on its radial outside with a fastening element to a heat-shielding part. A decoupling element of this kind has radial and axial play between the damping element and the sleeve element so that it is not always possible to avoid rattling noises. In addition, due to the play in both the axial and radial directions and due to dynamic movements of the sleeve element relative to the damping element, which is secured on its radial outside, it is not always possible to avoid the occurrence of a deformation of the damping element as a result of a sudden breaking of the sleeve when it is subjected to vibration.

In addition, EP 3 293 411 A1 has disclosed a decoupling element, which in addition to the damping element that can be embodied as a wire mesh, has a flat spiral spring, whose purpose is to resiliently absorb the radial play between the damping element (wire mesh) and the sleeve.

The disadvantage of this solution is that as a result of long-term operation, due to the forces that are introduced by the impingement of vibration, local plastically deformed impressions in the damping element can occur, particularly at the points in which the damping element is supported on wires/wire coils of the two-dimensional spiral spring. As a result of this, over time, a play can occur, which then subsequently tends to increase when the vibrational load stops. In such a case, the same situation exists as in the above-described variant in which rattling noises and the like can occur.

Furthermore, EP 3 252 340 A1 has disclosed a decoupling element, which is composed of a plurality of individual parts and as a vibrating and decoupling component, provides a pair of spiral springs, which are supported at their radially outer ends against the heat-shielding part and are supported with their radially inner ends against collars of a sleeve. This occurs without play in the radial and axial directions.

With this element, it is disadvantageous that between the sleeve element and the trimming edge of the opening in the heat-shielding part, there is a free, uncovered gap that heat and possibly also noise can pass through so that an undesirable penetration of heat and noise at the fastening point of the heat-shielding part occurs. In addition, with an element of this kind, only microscopic friction in the structure of the spring takes place when a deflection of the element takes place. There is no friction partner for the spiral spring so that in addition, no macroscopic friction of any appreciable amount takes place, i.e. friction of two parts against each other. This results in only a relatively minor damping of this element.

The object of the invention, therefore, is to disclose a decoupling element for reducing structure-borne noise, particularly for use in a heat shield system, which offers an optimal shielding action both with regard to heat radiation and with regard to noise penetration at the fastening point of the heat-shielding part and provides these properties even over the long term. In particular, a service life of such a decoupling element should be prolonged and the initial damping values with regard to noise damping and/or heat damping should be preserved for as long as possible.

SUMMARY OF THE INVENTION

According to the invention, the object is attained by a decoupling element for reducing structure-borne noise, particularly for use in a heat shield system, having a sleeve element with an insertion opening for the insertion of a fastener for fastening to a partner fastener, wherein the insertion opening extends in an axial direction A of the sleeve element and the sleeve element has collars protruding in a radial direction R, which are spaced apart from each other in the axial direction A, wherein between the collars, a damping element is positioned, which extends radially outward beyond the collars and is provided to be fastened to a heat-shielding part by means of a fastening element, and the damping element is embodied as a metal wire structure, wherein the damping element is positioned so that it is elastically prestressed in the axial direction A in a gap between the collars of the sleeve element.

These measures ensure that even with a longer use of the decoupling element in a vibration-encumbered loading condition, the damping element cannot develop any play in the axial direction, which can lead to undesirable noise generation, e.g. rattling, or to a reduced decoupling performance, e.g. damping.

In a preferred embodiment, the decoupling element is characterized in that the axial prestressing of the damping element is produced by means of an additional spring element, which exerts a force on the damping element in the axial direction A.

In particular, this measure serves on the one hand to ensure the axial prestressing of the damping element over the long term and on the other hand, with an additional spring element, it is also possible to precisely influence a spring characteristic of the damping element in the axial direction and thus to adjust the spring characteristic/damping characteristic of the decoupler in an application-specific way.

In another embodiment, the decoupling element is characterized in that for the axially prestressed support of the damping element, a spiral spring is provided, which in the relaxed state, has a frustoconical spatial form in cross-section.

This measure discloses a preferred embodiment of the spring element. A spiral spring is particularly suitable in that in the prestressed state, it has a low height in the axial direction (maximally one wire thickness of the wire from which the spiral spring is formed). The frustoconical spatial form offers a simple ability to adjust the prestressing force in the axial direction and thus to influence the damping characteristic and also the service life of the decoupling element and the wear of the damping element.

In another embodiment of the decoupler, instead of the spiral spring that is frustoconical in cross-section, it is also advantageously possible to use a wave washer, in particular a single-layer wave washer. In this case, the single-layer wave washer can be compressed to its material thickness in the axial direction A or can have a small amount of remaining spring travel.

In another embodiment, a decoupling element is characterized in that the axial prestressing of the decoupling element occurs through elastic deformation of the damping element itself.

This measure constitutes an embodiment of the decoupling element that has a particularly low number of parts and is easy to produce. Forming this embodiment of the decoupling element requires only the sleeve element, the damping element, and the fastening element.

In another embodiment, the decoupling element is characterized in that for the axial prestressing of the damping element itself, at least one of the collars of the sleeve has at least one indentation, which reduces the distance between the collars in the axial direction A.

By means of at least one indentation in at least one of the collars of the sleeve, the internal width of the gap between the collars of the sleeve can be locally reduced so that a clamping or deforming projection is produced and the damping element is locally compressed further relative to its initial state. Since the damping element is embodied of a metal wire structure, in particular in the form of a compressed wire mesh, this measure uses the axial elastic deformability of the damping element itself for its prestressing.

In another embodiment, the decoupling element is characterized in that the indentations are annular, dot-shaped, or linear stamped areas, which form the projection on at least one of the collars, wherein the projection projects in the direction toward the other collar and reduces the distance A between the collars.

These measures disclose a few useful spatial forms for the stamped areas, which can be provided in the collars and ensure the axial prestressing of the damping element over a very long operating time.

In another embodiment, the decoupling element is characterized in that the at least one stamped area is positioned in one of the collars and the collar having the stamped area has a smaller wall thickness than the other collar against which the damping element is pressed by the indentations.

To provide a good support for the damping element, which is embodied of its wire structure, it is advisable to embody the collar—which is positioned opposite from the collar that has the stamped area/projection for producing the clamping hold/elastic deformation of the damping element—as thicker so that a more solid support base is provided there.

In another embodiment, the decoupling element is characterized in that an amount of the projection of the stamped area corresponds to approximately $1/20$ to $1/5$, in particular $1/20$ to $1/10$, of a thickness of the damping element measured in the axial direction A.

As a dimension for the axial span of the projection/stamped area, $1/20$ to $1/5$, in particular $1/20$ to $1/10$, of the thickness of the damping element has proven useful for general purposes. In this case, the damping element is not compressed to such an extent that its wire segments are non-elastically "compressed into a block." But more importantly, a sufficiently secure hold of the damping element on the one hand and a sufficiently elastic deformation on the other are assured.

In another embodiment, the decoupling element is characterized in that the conical spiral spring rests in the radial direction R against an inside of the sleeve between the collars and protrudes outward beyond the collars in a radial direction R.

With this embodiment of the conical spiral spring, it is also possible with regard to the geometrical proportions (lever arms) to influence the spring characteristic and damping characteristic of the damping element in the axial direction in a simple way. Depending on the spring force of the conical spiral spring in the axial direction and depending on the radius of the contact point(s) of the conical spiral spring on the damping element outside the sleeve, it is possible to establish different overall spring characteristics.

In another embodiment, the decoupling element is characterized in that the damping element is supported on at least two coils of a wire that forms the conical spiral spring so that with a bending of the in particular disc-shaped damping element, a sufficient support of the damping element in the axial direction A inside the collars is assured.

This measure is a particularly advantageous design embodiment of the cooperation between the damping element and the spiral spring. Since as a result of a bending of the damping element (offset in the axial direction) a support of the damping element inside the sleeve is needed, it is considerably advantageous to implement this support by means of at least two coils of the spiral spring since in this case, it is possible to ensure a better absorption of bending moments over a large support span of two adjacent wire coils.

In another embodiment, the decoupling element is characterized in that the damping element is positioned spaced apart from the sleeve element on the radial inside.

This measure is particularly suitable if the intent is for a radially resilient support to be produced only with a particular deflection of the decoupling element in the radial direction.

In another embodiment, the decoupling element is characterized in that the sleeve element is embodied of one piece with a first collar that is formed onto it and a second collar that can be obtained by a shaping of a cylindrical section of the sleeve element.

With this measure, it is possible to further reduce the number of parts of the decoupling element according to the invention since the sleeve element consists of only a single part, which by means of forming is formed into a sleeve element having two collars.

In another embodiment, the decoupling element is characterized in that the sleeve element is embodied of two parts and can be assembled (compressed) out of two half-sleeves or can be produced from a half-sleeve element and a disc-shaped element by means of a form-locked connection.

These measures constitute alternative embodiments of the sleeve elements.

In another embodiment, the decoupling element is characterized in that the projections for the elastic deformation of the damping element are embodied as pointing from a collar of the sleeve element into the gap between the collars in the direction (axial direction A) toward the other collar.

This measure constitutes an advantageous embodiment of the positioning of the stamped areas in the collar(s).

In another embodiment, the decoupling element is characterized in that both collars of the sleeve element have at least one of the projections, which are positioned opposite from each other or offset from each other in a top view.

This measure serves to proposer suitable measures for the further individual adaptation of a damping element to the specific loading condition.

BRIEF DESCRIPTION OF THE DRAWINGS

The invention will be explained in greater detail below based on the drawings. In the drawings.

DETAILED DESCRIPTION OF THE PREFERRED EMBODIMENTS

Figure 1:
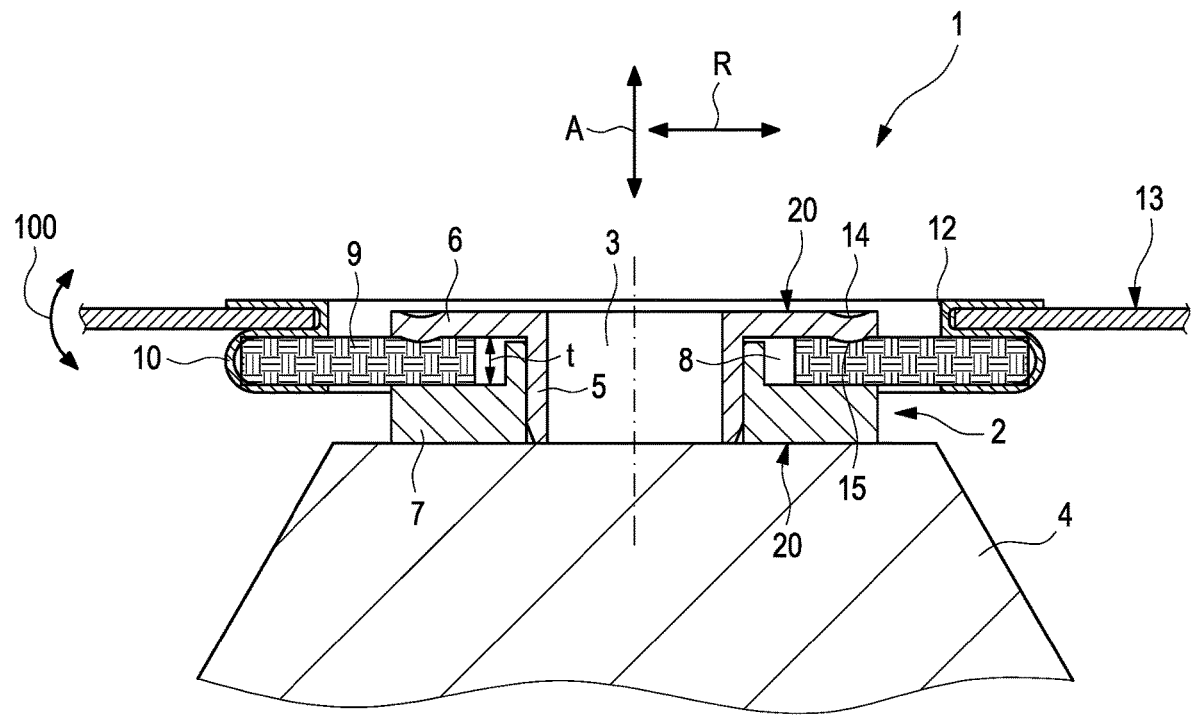
FIG. 1: shows a cross-section of a decoupling element according to the invention in a first embodiment.

FIG. 1 shows a cross-sectional view of a first embodiment of a decoupling element 1 according to the invention. Such a decoupling element has a sleeve element 2, which has an insertion opening 3 for a fastener (not shown), e.g. a screw.

Such a fastener can be used to fasten the decoupling element 1 to a partner fastener 4. On the inside in a radial direction R, the sleeve element 2 has at least one cylindrical section 5 and extending radially outward from the cylindrical section 5, a first collar 6 and a second collar 7. Viewed in an axial direction A, the first collar 6 and the second collar 7 are spaced apart from each other and form a gap 8 between themselves. The internal width of the gap 8 in the axial direction A, measured between sections of the collars 6, 7 without stamped areas is labeled t.

In the gap 8 there is a damping element 9, which preferably in a starting position, forms a radial gap between the sleeve element 2 and the damping element 9 so that the damping element 9 can be moved relative to the sleeve element 2 with a desired radial play.

With regard to the thickness of the damping element 9, which is preferably embodied as a wire structure, in particular as a metal wire structure, e.g. as a compressed wire mesh, the damping element 9 is embodied in such a way that it sits movably in the gap 8 with as little axial play as possible or in a slightly prestressed manner. This is the case if one imagines it without the indentations/stamped areas that will be described in greater detail below.

The damping element 9 is enclosed radially on the outside by a fastening element 10, which is embodied as essentially annular in a top view in the direction of the axial direction A and is embodied as S-shaped in the cross-section according to FIG. 1.

In this case, one arc section of the S-shaped cross-section of the fastening element 10 encloses the outer edge of the damping element 9, whereas a second arc section of the S-shaped fastening element 10 cross-sectionally surrounds a hole edge 12 of a hole in a heat-shielding part 13 and the decoupling element 1 is thus connected to the heat-shielding part 13. With an S-shaped fastening element 10 of this kind, the damping element 9 sits on one side of the heat-shielding part 13 relative to the heat-shielding part 13. In the present case, the side of the heat-shielding part 13 on which the damping element 9 is positioned by means of the fastening element 10 is the side, which faces the partner fastener 4 in the mounted state of the decoupling element 1. Depending on geometrical constraints, by means of the S-shaped fastening element 10, the damping element 9 can also be positioned on the opposite side of the heat-shielding part 13.

For the axial prestressing of the damping element 9, in the embodiment according to FIG. 1, there is an elastic deformation of the damping element 9 itself, which is embodied as a wire structure, e.g. as a compressed wire mesh, wire crochet, wire weave, wire knit, or a wire tangle. Such a non-solid element, which is composed of wire, has a degree of elastic deformability that is sufficiently high for the provided application. In the context of the invention, a material/component is considered to be "elastically deformable" if, based on its design, it has elastic properties in the thickness direction in the region of the gap 8. This does not mean a micro-elastic deformation, which is not relevant in practice and is naturally inherent in every material that is not ideally rigid. What is meant instead is a macroscopic elasticity that goes beyond the pure solid body elasticity of the material itself.

For the axial elastic prestressing of the damping element 9, stamped areas 14 are provided in one of the collars, in this case, the first collar 6. Such stamped areas 14, which are depicted as an embossed feature in the cross-section according to FIG. 1, form projections 15 on the opposite side of the collar 6 facing the gap 8, which locally reduce the internal width t of the gap 8. With a thickness of the damping element 9 that is to be chosen as described above, approximately with the dimension of the internal width t of the gap 8, such an embodiment results in the fact that the stamped areas 14, which form the projections 15, provide an elastic deformation of the metal wire structure. These measures make it possible, when the decoupling element is in the new state, to ensure a sufficient elastic prestressing of the damping element 9 in the axial direction A so that even after a longer-lasting vibrational load over the service life of the decoupling element 1, a defined axial play-free mounting of the damping element 9 between the collars 6, 7 is assured. Such a fixed support of the damping element 9 in the gap 8 that is play-free over the long term and is achieved in an axially prestressed way (through elastic deformation) achieves the fact that the vibrational load, as long as it has at least one component in the axial direction A, can be absorbed by a region of the wire mesh outside of the collars by means of a bending (which is schematically indicated with the double arrow 100). Such a bending then takes place essentially between the radially outer end of the collars 6, 7 and the enclosure of the damping element 9 by the fastening element 10. This bending produces bending moments, which, as described further below, are to be supported by means of suitable measures inside the gap 8. In the embodiment according to FIG. 1, this happens through the contact of the damping element 9 against the collars 6, 7 and/or against the projections 15.

The stamped areas 14 can be any kind of indentation. For example, the stamped areas 14 can be embodied as annular, dot-shaped, linear, or otherwise shaped in a top view in the axial direction of one of the collars 6 or 7. The essential thing is that on the side facing the gap 8 of the collar in which the stamped areas are produced, this stamped area produces a projection 15, which provides an elastic deformation of the damping element 9 in the axial direction A and thus ensures a long-lasting play-free support thereof.

It is particularly preferable for the collar (in this case, the first collar 6), which is provided with the stamped areas 14, to be embodied as thinner with regard to its wall thickness than the other collar (in this case, the second collar 7). This results in the fact that the resilient axial prestressing by means of the one collar (in this case, the first collar 6) is opposed by a solid second collar 7 that absorbs the prestressing.

The stamped areas 14 and the projections 15 that result from them can be provided in one collar 6, in the other collar 7, or in both collars 6, 7, wherein in particular, the stamped areas 14 are arranged so that they are positioned offset from one another in the top view. Depending on the elasticity of the damping element 9 in the axial direction A, it can also be useful for stamped areas 14 and the projections 15 that result from them to be provided in both collars 6 and 7 and for them to be positioned opposite from each other so that in a cross-section, the internal width t of the gap 8 is narrowed from both of the collars opposite from each other.

Figure 2:
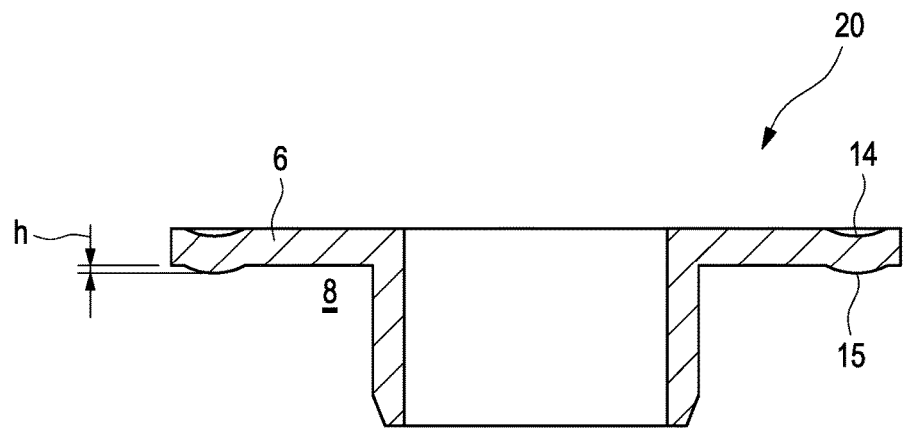
FIG. 2: shows a cross-section through a part of a sleeve element of the embodiment according to FIG. 1.

FIG. 2 shows a half-sleeve 20 of the sleeve element 2 of the embodiment according to FIG. 1 in an enlarged cross-sectional depiction. Viewed in cross-section, the collar 6 has a trough-shaped stamped area 14, which has been depressed far enough that a projection 15 is formed on the opposite side from the stamped area 14, facing the gap 8.

In the present invention, a dimension of between 1/20 to 1/5, in particular 1/20 to 1/10 of the thickness of the damping element 9 has proven useful as a dimension for the axial height h of the projection 15, wherein this dimension is essentially influenced by the extent to which the damping element 9 can be elastically deformed in the axial direction A.

It is conceivable for there to be several embodiments with regard to the sleeve element 2. The sleeve element 2 according to the embodiment in FIG. 1 is constructed of two parts comprising two half-sleeves 20, which can be plugged into each other. There are nevertheless conceivable embodiments in which there is a half-sleeve 20 and a disk-like element, which is connected in a form-locked way to free end regions of the half-sleeve so that the disk-like element forms one of the collars 6, 7 and the other half-sleeve embodies the cylindrical section 5 and the other collar 6, 7.

It is also possible to embody the sleeve element 2 of one piece, wherein one sleeve element blank (not shown) has one of the collars 6, 7 and an elongated (non-deformed) cylindrical section 5. Through a suitable forming of the cylindrical section 5, it can be bent radially outward, bent back radially outward, and formed so that it ends in a radially inward direction so that the second collar is composed of a folded-over region of the cylindrical section 5 of the sleeve element blank.

Figure 3:
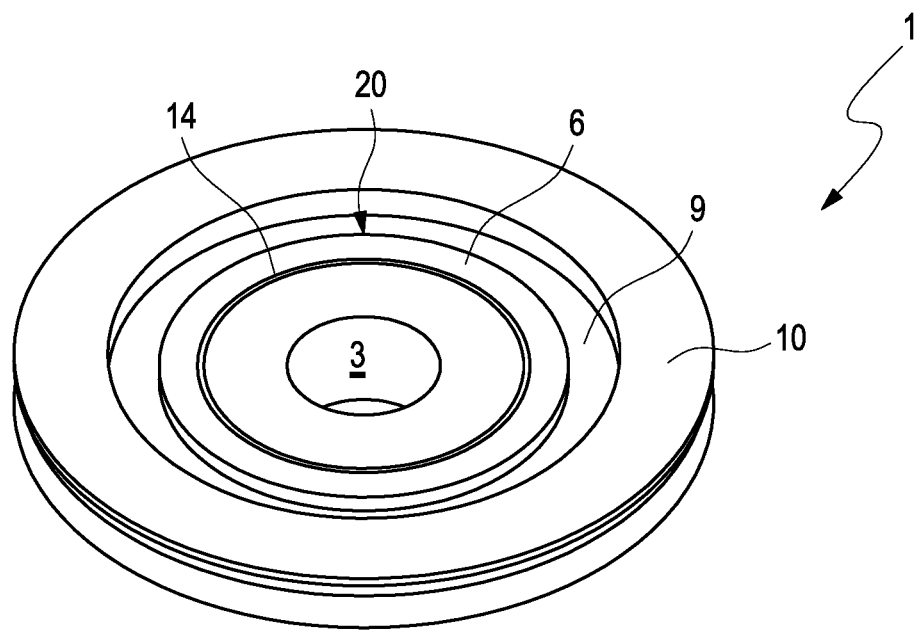
FIG. 3: shows an embodiment according to FIG. 1 in a perspective isometric view.

FIG. 3 shows a perspective view of the decoupling element according to the invention in a first embodiment, as described with reference to FIGS. 1 and 2. The above-described components are provided with the above-described reference numerals.

Figure 4:
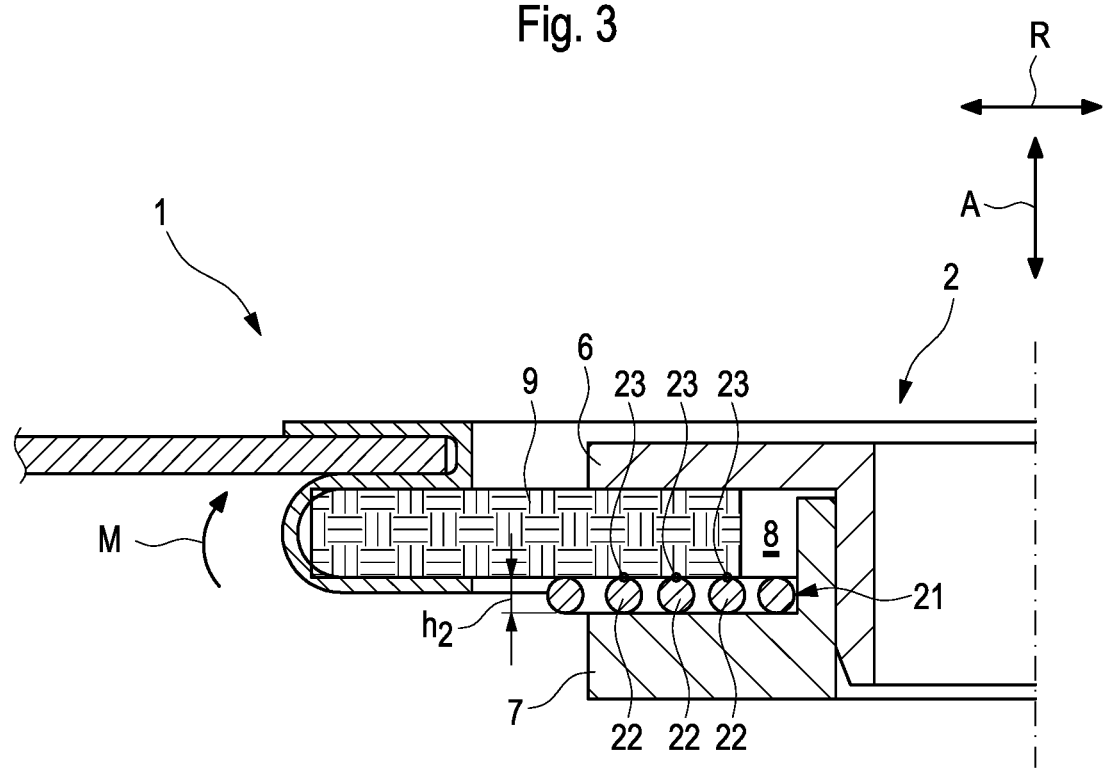
FIG. 4: shows a cross-section through a second embodiment of the decoupling element according to the invention.
Figure 5:
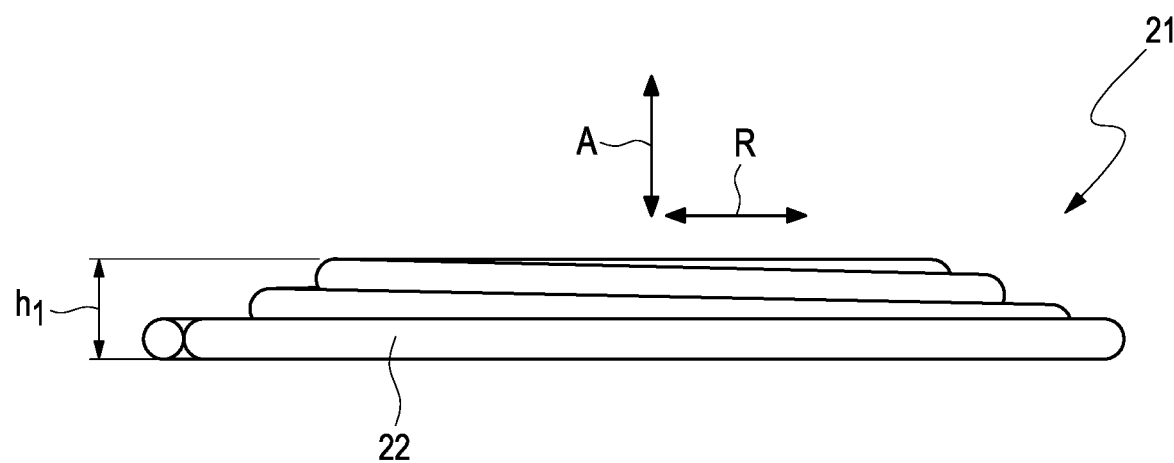
FIG. 5: shows a view of a frustoconical spiral spring used in the second embodiment according to FIG. 4 in its relaxed state.

In another embodiment according to FIG. 4, in order to produce the axial prestressing of the damping element 9, the decoupling element 1 has an additional component, namely a frustoconical spiral spring 21, which has a height $h_1$ in the axial direction A in the relaxed state (see FIG. 5). The spiral spring 21 has several coils 22, which are arranged in a spiral shape in the radial direction R (preferably not touching one another in the radial direction). Viewed in the axial direction A, from the relaxed starting position according to FIG. 5 with the height $h_1$, the spiral spring 21 can be elastically compressed to a height $h_2$ (see FIG. 4). The height $h_2$ in this case corresponds in particular and especially preferably to a wire diameter of the coil wire that forms the spiral spring 21. As a result, in the installation situation, the spiral spring 21 along with the damping element 9 is flat in the gap 8 between the collars 6 and 7 and has an axial span of only the amount of the wire thickness.

Through a prestressing of this kind, the damping element 9 inside the gap 8 is placed in an axially prestressed way against one of the collars 6 or 7, depending on the side on which the spring element 21 (spiral spring 21) is positioned. Naturally, it is also possible for a spring element 21, in particular embodied as a spiral spring 21, to be provided on both sides of the damping element 9.

It is particularly preferable for the damping element 9 inside the gap 8 between the collars 6, 7 to be in contact with at least two wire coils 22 (contact points 23). With such an embodiment, it is possible for a torque, which is representatively depicted by the torque arrow M, to be supported in an advantageous way in the gap 8 by one of the collars 6 and the contact points 23 with the spiral spring 21.

The frustoconical spiral spring element 21 ensures the lack of play in the axial direction A over the service life of the decoupling element 1.

Figure 6:
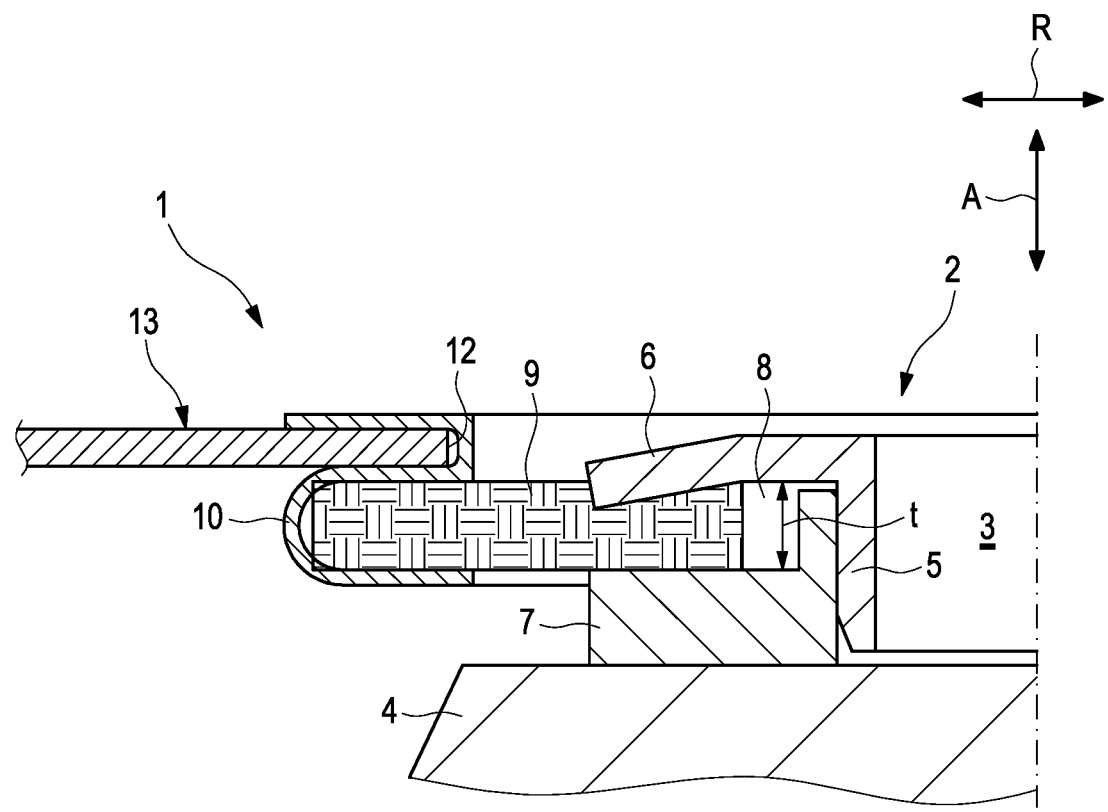
FIG. 6: shows a partially cut-away, enlarged view of a third embodiment of the decoupling element according to the invention.

FIG. 6 shows a third embodiment of the decoupling element according to the invention.

The decoupling element according to FIG. 6 corresponds essentially to the first embodiment according to FIG. 1 with the following differences. The first collar 6 of the sleeve element 2 has a disc spring-like spatial form in cross-section and its main dimension is oriented in the radial direction R pointing outward away from the cylindrical section 5. The disc spring-like embodiment of the first collar 6 in this case is produced in such a way that the gap 8 decreases as it extends radially outward from an internal width t at a radially innermost position because the first collar 6 is oriented in an inclined fashion relative to the horizontal (the horizontal in FIG. 6) so that it compresses the damping element 9 a little and thus prestresses it in a resilient way. The gap 8 is thus embodied as tapering toward the outside in the radial direction R. The inclined first collar 6 provides the corresponding elastic prestressing of the damping element 9, which ensures a play-free support of the damping element 9 in the gap 8 over its service life.

A feature that is common to all of the embodiments is the fact that because of the axial prestressing of the damping element 9 inside the gap 8, the decoupling element has an increased damping action and an increased freedom from rattling and increased noise reduction over its service life since even a long-lasting loading of the decoupling element 1 is elastically absorbed inside the sleeve element 2 so that the damping element 9 is held without play in the axial direction A, but is able to move radially.

It is also advantageous that the conception of the decoupling element according to the invention does not have a heat penetration gap in the sense of an open passage so that an increased damping of noise and/or heat compared to the prior art can be expected.

In summary, it can therefore be said that the object of the invention is the provision of a decoupling element, which ensures a defined and exact guidance of the heat-shielding part 13 for reducing the transmission of structure-borne noise at all times during the service life and at all times in which vibration is introduced (in particular with continuous loading). In addition to the reduction of the transmission of structure-borne noise, a particular shielding from heat is also particularly desirable.

The first and third embodiments attain the object by means of a particular embodiment of the collars 6, 7 of the sleeve element 2. In addition, the gap 8 between the two collars 6, 7 is adapted to the thickness of the damping element 9 so that in the initial state, there is no axial play. This ensures that right at the beginning of the deflection of heat system (consisting of the heat-shielding part 13 and at least one decoupling element 1 according to the invention), the decoupling element 1 can function in a way that reduces structure-borne noise. In addition, the form of the collar at its radially outer end is cambered or shaped and/or deformed in some other way such that when the decoupling element 1 is being assembled, the damping element 9 is compressed at the radially outer edge region of the collars 6, 7. Due to the elasticity of the damping element 9, it is prestressed at the above-mentioned location, i.e. at the positions of the projections 15 in the radially outer edge region of the at least one collar 6, 7. The prestressing of the wire mesh (damping element 9) compensates for the fact that with continuous loading of the decoupling element 1, an axial play is produced by movements/deformations in the structure of the wire mesh. With the aid of this measure, a defined and exact guidance of the shielding part 13 is assured at all times when vibration occurs, particularly with continuous loading.

In addition, a sliding movement of the damping element 9 (i.e. of the wire mesh element) between the enclosing collars 6, 7 can be influenced by changing the impression depth of the stamped areas 14. In the embodiment of the one-piece sleeve element, it is possible to vary the impression depth during the stamping procedure of the second sleeve collar. It is thus possible for the dynamic stiffnesses in the axial and radial directions of the decoupling element 1 to be modified for the respective intended purpose by means of the impression depth.

For example, the mechanical load capacity of the decoupling element 1 can be increased by increasing the impression depth. The advantage of adjusting the impression depth instead of the wire mesh parameters, e.g. its thickness, lies in the fact that it is thus possible to minimize the number of components and to achieve low materials costs based on mass production.

It follows from the foregoing that an essential feature of the invention is the design of the gap between the two collars 6, 7, which is preferably equal to the thickness of the damping element 9 so that in the initial state, there is no axial play.

Another essential point is to increase a prestressing of the damping element 9 in the axial direction A in order to extend the service life of the decoupling element 1. The axial prestressing can be achieved by using a conical spiral spring 21 for the prestressing of the damping element 9. It is also conceivable for there to be a cambering or shaping of the sleeve element collar for the sake of the prestressing of the damping element 9.

As a result of this, the decoupling element 1 according to the invention achieves an exact and defined guidance of the heat-shielding part 13 at all times when vibration occurs (particularly with continuous loading). A reduction/prevention of the occurrence of play in the axial direction A with continuous loading contributes to this.

Another essential advantage is that the dynamic stiffness in the axial direction A and radial direction R of the decoupling element can be modified for the respective intended purpose by varying the wire mesh impression height (impression reduction of the internal width t of the gap 8) or by prestressing the damping element 9. This achieves a high degree of variability of the decoupling element 1 according to the invention while at the same time achieving a low number of components and a low materials price based on mass production.

The invention claimed is:

1. A decoupling element for reducing structure-borne noise, comprising:
    a sleeve element with an insertion opening for insertion of a fastener for fastening to a partner fastener, wherein the insertion opening extends in an axial direction of the sleeve element and the sleeve element has collars protruding in a radial direction, which are spaced apart from each other in the axial direction,
    wherein between the collars, a damping element is positioned, which extends radially outward beyond the collars and is provided to be fastened to a heat-shielding part by a fastening element, and the damping element is embodied as a metal wire structure, wherein the damping element is positioned so that it is elastically prestressed in the axial direction in a gap between the collars of the sleeve element, wherein for the axial prestressing of the damping element itself, at least one of the collars of the sleeve element has at least one stamped area, which locally reduces a distance between the collars in the axial direction, and wherein the collar having the at least one stamped area has a smaller wall thickness measured in the axial direction than a wall thickness of the other collar measured in the axial direction against which the damping element is pressed by the at least one stamped area.

2. The decoupling element according to claim 1, wherein the axial prestressing of the damping element occurs through elastic deformation of the damping element itself.

3. The decoupling element according to claim 1, wherein the at least one stamped area is annular, dot-shaped, or a linear stamped area, which forms a projection on at least one of the collars, wherein the projection projects in a direction toward the other collar and reduces the distance between the collars.

4. The decoupling element according to claim 1, wherein an amount of the projection of the stamped area corresponds to approximately $1/20$ to $1/5$ of a thickness of the damping element measured in the axial direction.

5. The decoupling element according to claim 1, wherein the damping element is positioned spaced apart from the sleeve element on a radial inside.

6. The decoupling element according to claim 1, wherein the projection for the elastic deformation of the damping element is embodied as pointing from a first collar of the sleeve element into the gap between the first collar and a second collar in the axial direction toward the second collar.

* * * * *